(12) United States Patent
Roth

(10) Patent No.: US 11,256,884 B2
(45) Date of Patent: Feb. 22, 2022

(54) MOBILE HIGH DENSITY READ CHAMBERS FOR SCANNING RFID TAGGED ITEMS

(71) Applicant: AVERY DENNISON RETAIL INFORMATION SERVICES, LLC, Mentor, OH (US)

(72) Inventor: Mark W. Roth, North Miami, FL (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/255,417

(22) Filed: Jan. 23, 2019

(65) Prior Publication Data
US 2019/0228193 A1 Jul. 25, 2019

Related U.S. Application Data

(60) Provisional application No. 62/620,527, filed on Jan. 23, 2018.

(51) Int. Cl.
*G06K 7/10* (2006.01)
*G06K 7/14* (2006.01)

(52) U.S. Cl.
CPC ..... *G06K 7/10297* (2013.01); *G06K 7/10316* (2013.01); *G06K 7/10366* (2013.01); *G06K 7/1413* (2013.01)

(58) Field of Classification Search
CPC ............ G06K 7/10297; G06K 7/1413; G06K 7/10316; G06K 7/10306; G06K 7/10356; G06K 7/10386; G06K 7/10376
See application file for complete search history.

(56) References Cited

U.S. PATENT DOCUMENTS

2006/0228201 A1* 10/2006 Lenceski ............ A63B 71/0036
414/466
2007/0108273 A1* 5/2007 Harper ...................... G07F 9/10
235/382
(Continued)

FOREIGN PATENT DOCUMENTS

EP 2395457 12/2011

OTHER PUBLICATIONS

International Search Report and Written Opinion dated Apr. 9, 2019 issued in corresponding IA No. PCT/US2019/014753 filed on Jan. 23, 2019.
(Continued)

*Primary Examiner* — Laura A Gudorf

(57) ABSTRACT

Mobile high density read chambers are provided for scanning a plurality of RFID tagged items. Such chambers may include an enclosure with an interior defined by upper and lower surfaces, with a sidewall extending therebetween. An access (such as a door) may be associated with the sidewall, with the access being at least partially opened to access the interior of the enclosure from an outside location. The chamber further includes an RFID reader having at least one antenna positioned within the interior of the enclosure to emit a scanning signal within the interior of the enclosure. A base supports the enclosure, with at least one movement member supporting the base and configured to engage a ground surface for transport of the mobile high density read chamber. The movement member may comprise one or more wheels, ball casters, low-friction sliders, or rollers, for example.

20 Claims, 3 Drawing Sheets

(56) References Cited

U.S. PATENT DOCUMENTS

| | | | |
|---|---|---|---|
| 2008/0272914 A1* | 11/2008 | Murray | G06K 7/0008 |
| | | | 340/572.1 |
| 2010/0102969 A1* | 4/2010 | Svalesen | G06K 17/0022 |
| | | | 340/572.8 |
| 2010/0314898 A1* | 12/2010 | Hawkinson | B60P 1/64 |
| | | | 296/37.6 |
| 2014/0085052 A1* | 3/2014 | Singh | G06K 7/10356 |
| | | | 340/10.1 |
| 2014/0138440 A1* | 5/2014 | D'Ambrosio | G06Q 10/087 |
| | | | 235/385 |
| 2015/0028997 A1 | 1/2015 | Phillips et al. | |
| 2015/0260772 A1* | 9/2015 | Aubin | G01R 29/105 |
| | | | 343/703 |
| 2016/0117534 A1 | 4/2016 | Roth | |
| 2017/0027079 A1* | 1/2017 | Dombrowski | H02J 5/00 |
| 2017/0228569 A1* | 8/2017 | Mardkha | G06K 7/10425 |
| 2018/0149420 A1* | 5/2018 | Lee | G02B 6/0088 |
| 2019/0035497 A1* | 1/2019 | Kolberg | A61B 5/00 |

OTHER PUBLICATIONS

International Preliminary Report on Patentability dated Aug. 6, 2020 issued in corresponding IA No. PCT/US2019/014753 filed on Jan. 23, 2019.

* cited by examiner

MOBILE HIGH DENSITY READ CHAMBERS FOR SCANNING RFID TAGGED ITEMS

CROSS-REFERENCE TO RELATED APPLICATION(S)

The present application claims priority to and the benefit of United States provisional utility patent application No. 62/620,527 filed with the United States Patent and Trademark Office Jan. 23, 2018, which is incorporated herein by reference in its entirety.

BACKGROUND

Field of the Disclosure

The present subject matter relates to radio frequency identification ("RFID") devices. More particularly, the present subject matter relates to mobile chambers for scanning containers housing a plurality of RFID tagged items.

Description of Related Art

It is known to employ RFID technology to tag and identify individual pieces of merchandise. Typically, a plurality of RFID tagged items will be placed into a carton or similar container for shipment from a manufacturing or packaging facility to a retail location. Depending on the demands of the retail location, a plurality of cartons or containers may be delivered, with two or more cartons or containers shipped together on a pallet or the like.

Before the packaged items are shipped out of the manufacturing or packaging facility and/or when the packaged items arrive at the retail location, it may be advantageous to check the contents of the carton or container to ensure that the proper number of items are in the container, as well as the proper assortment of items. According to one known approach, handheld RFID scanning devices are used to catalog the contents of a carton or container. In general, handheld RFID scanning devices are useful in that the tool may be moved to the location of the carton or container, rather than requiring the carton or container to be moved for scanning, which saves time and labor.

Handheld RFID scanning devices are particularly well-suited for two specific tasks. The first is conducting a general inventory process, whereby the reader power of the handheld RFID scanning device is turned up to maximum power and the trigger is pressed initiating the broad area reading of RFID tags commences. The second task a handheld RFID scanning device does very well is conducting a search for specific items such as would be done with a Geiger counter feature. However, while handheld RFID scanning devices excel in particular situations, they may not be well-suited to others, such as scanning a single carton in a densely packed area of RFID tagged cartons of goods. There is very little control of the RF field generated by a handheld RFID scanning device, meaning that, if additional RFID tagged inventory is nearby, there is a high likelihood that stray reads will occur where only scanning of a specific carton is intended. Elaborate means must be employed to provide some form of isolation when using a handheld RFID scanning device to attempt to interrogate a single carton, in contrast to the broad scanning of cartons, which is a task such devices perform well. Furthermore, proper cataloging of the carton or container is reliant upon the skill and diligence of the individual operating the handheld device.

According to another approach, open scanning portals are used to catalog individual cartons or containers or a plurality of cartons or containers together on a pallet or the like. These are typically gateways at dock doors that forklifts drive through, with the RFID scanning devices associated with the portal being intended to scan the tagged items within the cartons or containers. Such systems may be acceptable when only scanning labels on the cartons or containers or pallets, as only a small numbers of labels are being scanned, but they may be less successful when attempting to scan all of the individual items housed within a carton or container or within a stack of cartons or containers, due to the increased density of RFID tags.

Yet another approach is described in US Patent Application Publication No. 2016/0117534, which is hereby incorporated herein by reference. High density read chambers are provided for scanning and/or encoding a plurality of RFID tagged items. Such chambers may include an enclosure with an interior defined by upper and lower surfaces, with a sidewall extending therebetween. An access (such as a door) may be associated with at least one of the surfaces or the sidewall, with the access being at least partially opened to access the interior of the enclosure from an outside location. The chamber further includes an antenna positioned within the interior of the enclosure and an RFID reader associated with the antenna. The RFID reader receives signals from and/or transmits signals to the antenna, while the antenna emits a scanning or encoding signal within the interior of the enclosure, with at least a portion of at least one of the surfaces or the sidewall including a signal-reflective material facing the interior of the enclosure. The chamber may be a fixture or installation, allowing cartons or palleted items to be placed within the enclosure for scanning.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto. The present subject matter includes the insight that it is advantageous to provide an RFID scanning device that is sufficiently sized and particularly configured so as to be mobile, while avoiding the disadvantages associated with handheld RFID scanning devices.

In one aspect, a mobile high density read chamber for scanning a plurality of RFID tagged items includes an enclosure. The enclosure has upper and lower surfaces, with a sidewall extending between the upper and lower surfaces to define an interior of the enclosure. An access is associated with the sidewall and is configured to be at least partially opened to access the interior of the enclosure from an outside location. The chamber also includes an RFID reader having at least one antenna positioned within the interior of the enclosure to emit a scanning signal within the interior of the enclosure. At least a portion of at least one of the upper surface, the lower surface, and the sidewall includes a signal-reflective material facing the interior of the enclosure.

In another aspect, a mobile high density read chamber for scanning a plurality of RFID tagged items includes an enclosure. The enclosure has upper and lower surfaces, with a sidewall extending between the upper and lower surfaces to define an interior of the enclosure. An access is associated with the sidewall and is configured to be at least partially opened to access the interior of the enclosure from an outside location. The chamber also includes an RFID reader having at least one antenna positioned within the interior of the enclosure associated with the upper surface of the enclosure to emit a scanning signal within the interior of the enclosure. At least a portion of at least one of the upper surface, the lower surface, and the sidewall includes a signal-reflective material facing the interior of the enclosure.

In a further aspect, a mobile high density read chamber for scanning a plurality of RFID tagged items includes an enclosure. The enclosure has upper and lower surfaces, with a sidewall extending between the upper and lower surfaces to define an interior of the enclosure. An access is associated with the sidewall and is configured to be at least partially opened to access the interior of the enclosure from an outside location. The chamber also includes an RFID reader having at least one antenna positioned within the interior of the enclosure to emit a scanning signal within the interior of the enclosure. At least a portion of at least one of the upper surface, the lower surface, and the sidewall includes a signal-reflective material facing the interior of the enclosure. Also included is a barcode scanner and a microprocessing unit including a Universal Service Bus port, wherein the barcode scanner is configured to be powered by accessing the USB port. It is important to note, that while this application addresses the utilization of USB, it is not limited to such. The present invention contemplates the utilization of other scanners known in the art.

In an additional aspect, a mobile high density read chamber for scanning a plurality of RFID tagged items includes an enclosure. The enclosure has upper and lower surfaces, with a sidewall extending between the upper and lower surfaces to define an interior of the enclosure. An access is associated with the sidewall and is configured to be at least partially opened to access the interior of the enclosure from an outside location. The chamber also includes an RFID reader having at least one antenna positioned within the interior of the enclosure to emit a scanning signal within the interior of the enclosure. At least a portion of at least one of the upper surface, the lower surface, and the sidewall includes a signal-reflective material facing the interior of the enclosure. An internal power source is provided for powering components of the mobile high density read chamber, optionally further including a charging system associated with the internal power source.

In an added aspect, a mobile high density read chamber for scanning a plurality of RFID tagged items includes an enclosure supported by a base that comprises a compartment, optionally defining a shelf spaced below the enclosure. The enclosure has upper and lower surfaces, with a sidewall extending between the upper and lower surfaces to define an interior of the enclosure. An access is associated with the sidewall and is configured to be at least partially opened to access the interior of the enclosure from an outside location. The chamber also includes an RFID reader having at least one antenna positioned within the interior of the enclosure to emit a scanning signal within the interior of the enclosure. At least a portion of at least one of the upper surface, the lower surface, and the sidewall includes a signal-reflective material facing the interior of the enclosure.

In yet another aspect, a mobile high density read chamber for scanning a plurality of RFID tagged items includes an enclosure. The enclosure has upper and lower surfaces, with a sidewall extending between the upper and lower surfaces to define an interior of the enclosure. The enclosure is configured to prevent the scanning signal emitted by the antenna or antennas from exiting the interior of the enclosure. An access is associated with the sidewall and is configured to be at least partially opened to access the interior of the enclosure from an outside location. The chamber also includes an RFID reader having at least one antenna positioned within the interior of the enclosure to emit a scanning signal within the interior of the enclosure. At least a portion of at least one of the upper surface, the lower surface, and the sidewall includes a signal-reflective material facing the interior of the enclosure.

In an additional aspect, a mobile high density read chamber for scanning a plurality of RFID tagged items includes an enclosure. The enclosure has upper and lower surfaces, with a sidewall extending between the upper and lower surfaces to define an interior of the enclosure, wherein the enclosure is configured to reflect the scanning signal emitted by the antenna or antennas. An access is associated with the sidewall and is configured to be at least partially opened to access the interior of the enclosure from an outside location. The chamber also includes an RFID reader having at least one antenna positioned within the interior of the enclosure to emit a scanning signal within the interior of the enclosure. At least a portion of at least one of the upper surface, the lower surface, and the sidewall includes a signal-reflective material facing the interior of the enclosure.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
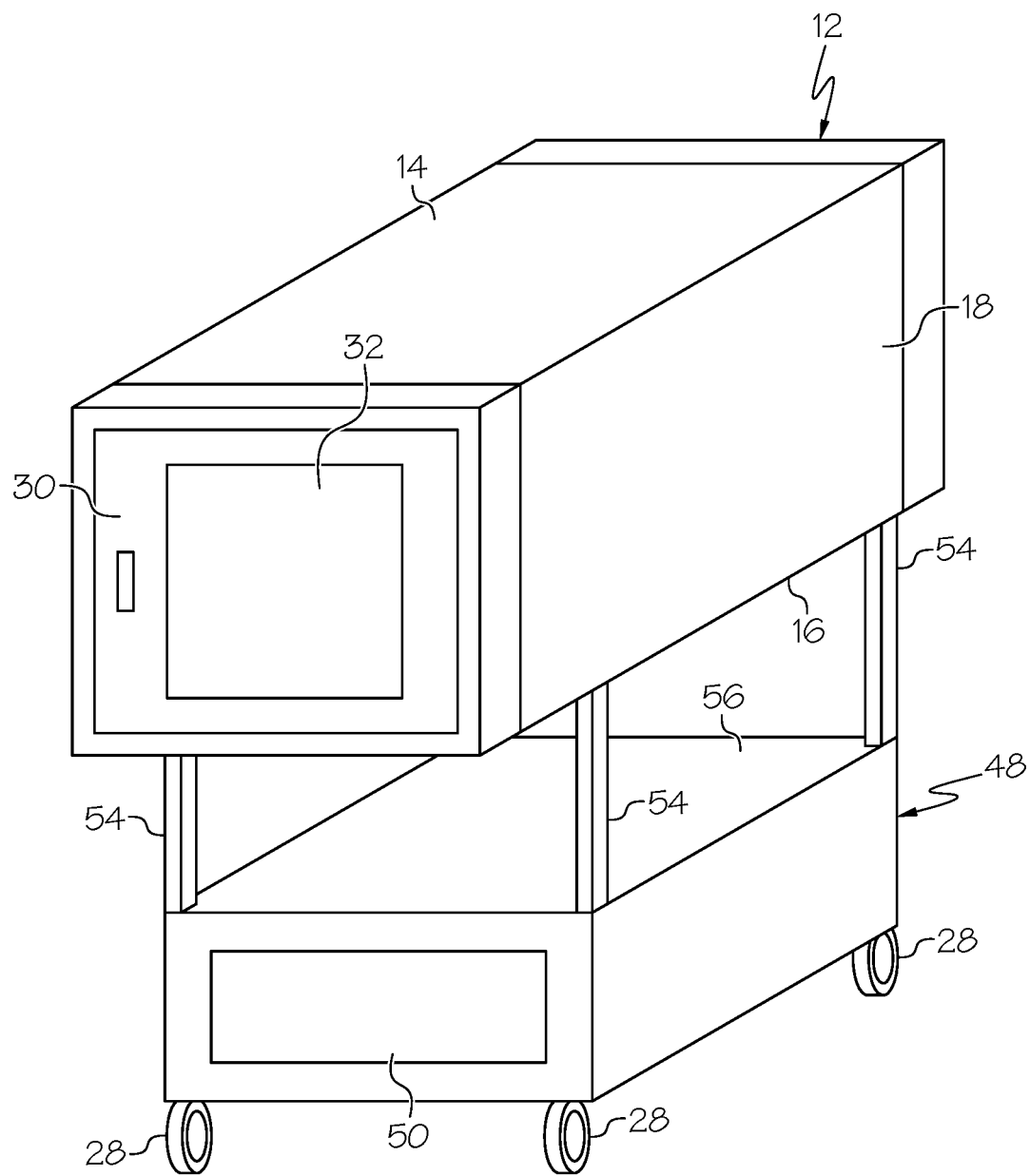
FIG. 1 is a front perspective view of a mobile high density read chamber configured for scanning a plurality of RFID tagged items according to an aspect of the present disclosure.
Figure 2:
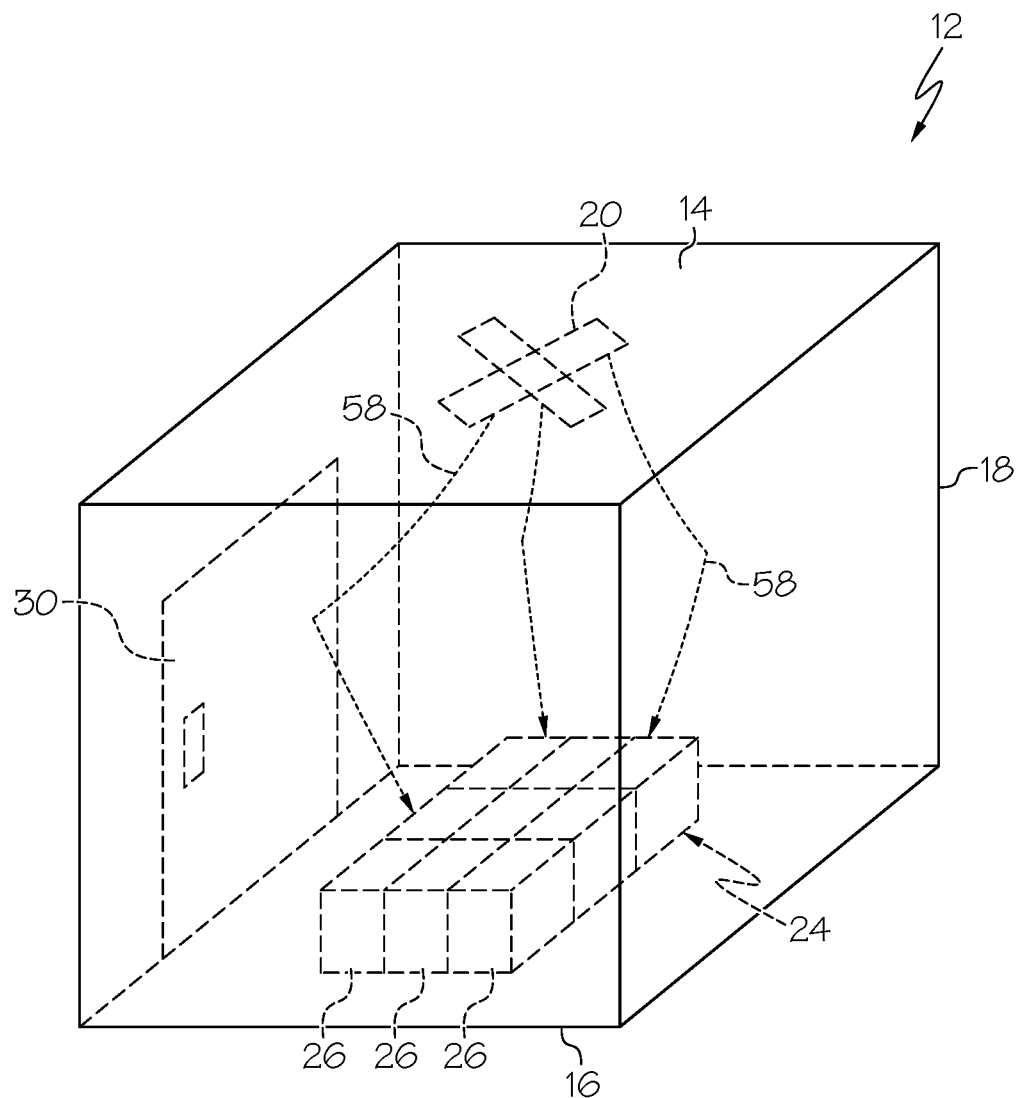
FIG. 2 is a side perspective view of an enclosure of the mobile high density read chamber of FIG. 1.
Figure 3:
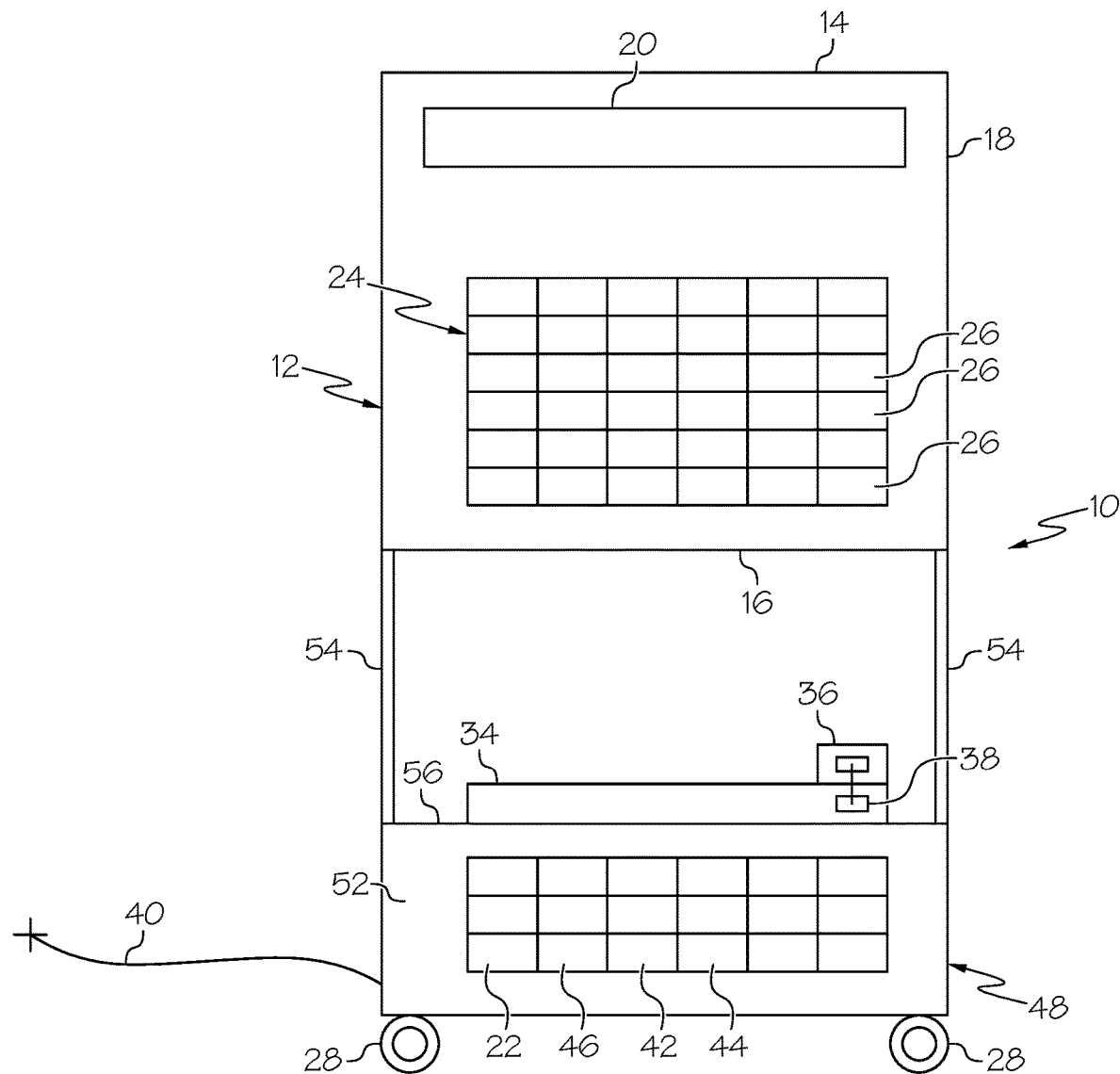
FIG. 3 is a diagrammatic, front elevational view of the mobile high density read chamber of FIG. 1.

FIG. 1 is a diagrammatic view of an exemplary mobile high density read chamber 10 according to an aspect of the present disclosure. The chamber 10 includes an enclosure 12 defined by upper and lower surfaces 14 and 16, with a sidewall 18 extending between the upper and lower surfaces 14 and 16. At least one antenna or RFID signal source 20 is positioned within the interior of the enclosure 12 (FIGS. 2 and 3). The antenna or antennas 20 may be variously configured (provided that each is capable of sending and receiving RFID signals), but in one embodiment may be provided as a dipole-type antenna that is configured to send RFID signals to and receive RFID signals from other RFID devices (e.g., RFID tags and an RFID reader). The antenna 20 is associated with or comprises a component of an RFID reader 22 (FIG. 3), which may be associated with the antenna 20 via either a wired or wireless connection.

The enclosure 12 is sized and configured to accommodate a carton or container 24 housing a plurality of RFID tagged items 26 (FIGS. 2 and 3), with the particular size and shape depending on the size and shape of the carton or container 24 to be processed by the chamber 10. The overall profile of the enclosure 12 and the chamber 10 is designed with movement in mind, which may include strategically located handles positioned so as to provide an operator with a means to comfortably grasp the entire assembly and leverage movement. These handles allow for ease of movement, whether pushing or pulling the chamber 10, as well as for steering. The enclosure 12 and chamber 10 are preferably sized to allow for movement down aisles and standard sized doorways in a facility by a single human. However, it is also within the scope of the present disclosure for the enclosure 12 (and, hence, the chamber 10) to be larger and/or heavier, such that it is more appropriate for it to be moved by the combined efforts of more than one human, although it is still preferred for the enclosure 12 and chamber 10 to be sized for movement through a facility. To put into context, if a large truck load of cartons is received at a dock door and requires some form of RFID audit process to ensure that all items are accounted for in each carton against a purchase order, it is far easier to roll a chamber 10 into position to deal with this surge of workload and/or move again to the next dock door experiencing said back up scenario. A chamber 10 according to the present disclosure also excels in conducting random audits. Random audits take place randomly, such that various conveyor lines within a distribution center may randomly require audit functionality. It may not make economic sense to equip every conveyor line with an audit solution if a movable solution (i.e., a chamber 10 according to the present disclosure) can be provided to instead be moved to the line in need.

To enable mobility, the chamber 10 includes at least one movement member 28 configured to engage a ground surface for transport of the chamber 10. The movement member or members 28 may be variously configured without departing from the scope of the present disclosure. For example, the movement members 28 may be configured as wheels or ball casters or rollers or low-friction sliders. If multiple movement members 28 are provided, at least two of the movement members 28 may be differently configured, although it may be advantageous for all of the movement members 28 to be similarly or identically configured to allow for more uniform support and mobility.

The enclosure 12 includes at least one access 30 (FIGS. 1 and 2), such as a door or portal, associated with the sidewall 18. The access 30 may be at least partially opened to access the interior of the enclosure 12 from an outside location, which allows a carton or container 24 to be placed into the enclosure 12 for processing (with the access 30 preferably being closed during processing) and subsequently removed from the enclosure 12 following processing. In one embodiment, the access 30 is inset into the sidewall 18, in the fashion of a bank vault, with the outer surface of the access 30 being flush with the outer surface of the surrounding sidewall 18 when the access 30 is closed. Such a configuration prevents the access 30 from being sheared off or knocked off of the enclosure 12 during transport if an obstacle is encountered.

A display screen 32 (FIG. 1) may be integrated or incorporated or otherwise inset into the access 30, which allows for comfortable viewing height. The display screen 32 may be configured for viewing only or may instead be configured as a user interface that an operator may interact with to control operation of the various components of the chamber 10. For example, the display screen may be associated with a microprocessing unit 34 (FIG. 3), such as a computer, which is, in turn, associated with the RFID reader 22 and the other electronic components of the chamber 10 to control and/or monitor operation of the various electronic components. The electronic components of the chamber 10 may vary without departing from the scope of the present disclosure, but in one embodiment, the chamber 10 includes a barcode reader or scanner 36. If provided, the barcode scanner 36 may be a fixture of the enclosure 12, configured to scan a barcode positioned within the enclosure 12, or may be a separately provided handheld unit (as in FIG. 3), in which case the barcode scanner 36 may be configured to be powered by accessing a Universal Service Bus port 38 of the microprocessing unit 34. Additional or alternative electronic components may also be incorporated into the chamber 10 without departing from the scope of the present disclosure.

The various electronic components of the chamber 10 may be powered by an external or an internal power source. For example, FIG. 3 illustrates a power cord 40 configured to access an external power source (e.g., an alternating current electrical outlet) to power the electronic components of the chamber 10. FIG. 3 also illustrates an internal power source or battery 42, which may be provided in addition to or instead of the power cord 40. The internal power source 42, if provided, may be variously configured without departing from the scope of the present disclosure. In one embodiment, the internal power source 42 is provided with an associated charging system 44 (FIG. 3) to allow for recharging of the internal power source 42. Although other battery technologies, such as ion, could be employed it may be preferred to employ sealed lead acid technology, which has economic and performance advantages that contribute to making the chamber 10 affordable and effective. Additionally, the use of sealed lead acid batteries reduces the risk of explosion or fire as all too frequently seen with other types of batteries, such as those employing lithium ion technology. It will be appreciated that substantially any power source, especially selected with safety in mind, can be utilized.

If the chamber 10 is provided with an internal power source or battery 42, it may further include an on-board power inversion system 46 (FIG. 3), which effectively converts the stored direct current power of a battery to alternating current for powering electronic components of the chamber 10 (e.g., the RFID reader 22, display screen 32, and/or the microprocessing unit 34) having a plug for receiving alternating current.

The power inversion system 46 and other components of the chamber 10 may be variously associated with the chamber 10 without departing from the scope of the present disclosure. However, in the illustrated embodiment, the chamber 10 is provided with a base 48 (which may include an access or door 50, as in FIG. 1) supported by the movement member(s) 28 and defining a compartment 52 (FIG. 3) to store various components of the chamber 10, which may preferably be the components that are not routinely directly handled by an operator in scanning a carton or container 24, such as the RFID reader 22 and the internal power source 42. It may be preferred for other components (e.g., the microprocessing unit 34 and barcode scanner 36) that may be more commonly handled by an operator when scanning a carton or container 24 to be positioned in a more readily accessible location. For example, FIGS. 1 and 3 show the base 48 supporting the enclosure 12 (e.g., on legs or vertical supports 54), with an upper surface of the base 48 defining a shelf or horizontal support surface 56 spaced below the enclosure 12, where various components of the chamber 10 may be positioned. It may be preferred for the chamber components positioned on the shelf 56 to occupy only a portion of the available space of the shelf 56, with the remainder of the shelf 56 being free to accommodate anything else that may be helpful to an operator, such as paperwork, a utility knife, a tape dispenser, and the like. The vertical supports 54 may be configured to allow for the routing of cables or cords from the enclosure 12 to the base 48 (e.g, by being partially hollow or defining channels or grooves) for allowing the transmission of power to the components of the enclosure 12 (e.g., the display screen 32) without cluttering the shelf 56, and to provide a means for user preferred height and adjustment for better ergonomics than that which is presently available to the user.

Turning back now to the enclosure 12, the antenna(s) 20 may be positioned at various locations within the interior of the enclosure 12 (e.g., associated with the sidewall 18 or the lower surface 16), but is/are illustrated in FIGS. 2 and 3 as being associated with the upper surface 14. Such a configuration may be advantageous to decrease the risk of the carton or container 24 contacting and damaging the antenna(s) 20 during use of the chamber 10. In use, each antenna 20 emits scanning signals 58 within the enclosure 12 that contact or communicate with the RFID tagged items 26 (FIG. 2).

The surfaces of the enclosure 12 are configured to prevent the scanning signals 58 emitted by the antenna(s) 20 from exiting the interior of the enclosure 12, thereby ensuring that only the subject RFID tagged items 26 are being scanned. More preferably, the surfaces defining the interior of the enclosure 12 may include a signal-reflective material. By providing a signal-reflective enclosure 12, an antenna 20 positioned in one location within the enclosure 12 may emit signals that can reach RFID tagged items 26 positioned at various locations throughout the interior of the enclosure 12. In one embodiment, at least a portion of at least one of the upper surface 14, the lower surface 16, and/or the sidewall 18 includes a signal-reflective material facing the interior of the enclosure 12, although it may be preferred for all or substantially all of the upper surface 14, the lower surface 16, and the sidewall 18 to comprise a signal-reflective material for improved signal reflection. For example, in one embodiment, the upper surface 14, the lower surface 16, and the sidewall 18 are each formed of a signal-reflective metallic material (e.g., stainless steel skin) that may be supported by a painted metal frame or the like. By such a configuration, it has been found that cartons or containers 24 having a large number of RFID tagged items 26 within the enclosure 12 can be fully scanned, without other RFID tagged items in the vicinity of the chamber 10 also being scanned.

In an exemplary method of using the chamber 10, the access or door 30 of the enclosure 12 is at least partially opened. A carton or container 24 is then placed into the interior of the enclosure 12, followed by the access or door 30 being closed. With the carton or container 24 in the enclosure 12, a barcode associated with the carton or container 24 may be scanned using the barcode scanner 36, if associated with the interior of the enclosure 12. Alternatively, if the barcode scanner 36 is a handheld device or oriented to scan a barcode positioned outside of the enclosure 12, then the barcode may be scanned prior to closing the access or door 30. In another alternative approach, the barcode may be scanned prior to inserting the carton or container 24 into the enclosure 12, although it may be advantageous to scan the barcode inside the enclosure 12 to ensure that the carton or container 24 to be processed corresponds to the scanned barcode.

Next, an operator may initiate the scanning procedure, such as by operating the display screen 32 (if provided as a user interface) or the microprocessing unit 34. Initiating the scanning procedure instructs the antenna(s) 20 to emit scanning signals that contact or communicate with the RFID tagged items 26, with the antenna(s) 20 receiving information about the scanned items 26 and transmitting such information to the RFID reader 22. Typically, the scanning step is completed in seconds. The RFID reader 22 may communicate with the display screen 32 and/or microprocessing unit 34 to display information about the RFID tagged items 26, such as the total count and other information (e.g., a breakdown of the different types of items in the carton or container 24 and the count for each type of item, the date and time of the procedure, etc.). The operator may then verify that the scanning procedure is complete, for example by pressing a "COMPLETE" button or icon of the display screen 32 or microprocessing unit 34, which may store the data scanned by the chamber 10. Alternatively, the chamber 10 may automatically store the data and end the scanning procedure without requiring confirmation from the operator.

With the scanning procedure ended, the operator may open the access or door 30 and remove the carton or container 24 from the enclosure 12. Additional and/or alternative steps may be incorporated into the illustrated procedure without departing from the scope of the present disclosure. For example, the chamber 10 may check the scanned items 26 against an expected count and inventory to ensure that the proper number and type of items are present in the carton or container 24. If the results differ from what is expected, then the operator (or the system controller) may initiate a "RESET" procedure to repeat the scan procedure.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A mobile high density read chamber for scanning a plurality of RFID tagged items, comprising:
   an enclosure including an upper surface, a lower surface, and a sidewall extending between the upper and lower surfaces to define an interior of the enclosure;
   an access associated with the sidewall and configured to be at least partially opened to access the interior of the enclosure from an outside location;
   an RFID reader including at least one antenna positioned within the interior of the enclosure and configured to emit a scanning signal within the interior of the enclosure;
   a barcode scanner fixed inside the enclosure and configured to scan a barcode positioned within the enclosure;
   a base supporting the enclosure;
   a microprocessing unit including a Universal Service Bus port supported on a horizontal support surface spaced below the enclosure; and
   at least one movement member supporting the base and configured to engage a ground surface for transport of the mobile high density read chamber.

2. The mobile high density read chamber of claim 1, wherein the at least one antenna is associated with the upper surface of the enclosure.

3. The mobile high density read chamber of claim 1, wherein the at least one antenna comprises a plurality of antennas.

4. The mobile high density read chamber of claim 1, further comprising a barcode scanner provided as a handheld unit outside the enclosure.

5. The mobile high density read chamber of claim 4, wherein the barcode scanner is configured to be powered by accessing the Universal Service Bus port.

6. The mobile high density read chamber of claim 1, further comprising a power cord configured to access an external power source to power components of the mobile high density read chamber.

7. The mobile high density read chamber of claim 1, further comprising an internal power source configured to power components of the mobile high density read chamber without requiring access to an external power source.

8. The mobile high density read chamber of claim 7, further comprising a charging system associated with the internal power source.

9. The mobile high density read chamber of claim 7, wherein the internal power source comprises a sealed lead acid battery.

10. The mobile high density read chamber of claim 1, further comprising a display screen incorporated into the access.

11. The mobile high density read chamber of claim 1, wherein the access is inset into the sidewall.

12. The mobile high density read chamber of claim 1, wherein the base comprises a compartment.

13. The mobile high density read chamber of claim 1, wherein the base defines a shelf spaced below the enclosure.

14. The mobile high density read chamber of claim 1, wherein the at least one movement member comprises a plurality of wheels.

15. The mobile high density read chamber of claim 1, wherein the at least one movement member comprises a plurality of ball casters.

16. The mobile high density read chamber of claim 1, wherein the at least one movement member comprises a plurality of low-friction sliders.

17. The mobile high density read chamber of claim 1, wherein the at least one movement member comprises a plurality of rollers.

18. The mobile high density read chamber of claim 1, wherein the enclosure is configured to prevent the scanning signal emitted by the at least one antenna from exiting the interior of the enclosure.

19. The mobile high density read chamber of claim 1, wherein the enclosure is configured to reflect the scanning signal emitted by the at least one antenna.

20. The mobile high density read chamber of claim 1, wherein at least a portion of the enclosure is formed of a steel material.

* * * * *